United States Patent
Bowman et al.

(10) Patent No.: US 11,853,390 B1
(45) Date of Patent: Dec. 26, 2023

(54) VIRTUAL/AUGMENTED REALITY DATA EVALUATION

(71) Applicant: Amazon Technologies, Inc., Seattle, WA (US)

(72) Inventors: Bradley Scott Bowman, Berlin (DE); Maksim Lapin, Berlin (DE); Leo Parker Dirac, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1490 days.

(21) Appl. No.: 16/054,709

(22) Filed: Aug. 3, 2018

(51) Int. Cl.
*G06N 3/08* (2023.01)
*G06F 18/2135* (2023.01)
*G06N 3/04* (2023.01)
*G06N 20/00* (2019.01)
*G06F 16/904* (2019.01)
*G06F 18/21* (2023.01)

(52) U.S. Cl.
CPC ........ *G06F 18/2135* (2023.01); *G06F 16/904* (2019.01); *G06F 18/217* (2023.01); *G06N 3/04* (2013.01); *G06N 3/08* (2013.01); *G06N 20/00* (2019.01)

(58) Field of Classification Search
CPC ....................................... G06N 3/08
See application file for complete search history.

(56) References Cited

U.S. PATENT DOCUMENTS

| 2009/0041310 A1* | 2/2009 | Yang | G06V 40/20 382/118 |
| 2015/0302656 A1* | 10/2015 | Miller | A63F 13/577 345/633 |
| 2017/0068751 A1* | 3/2017 | Bulusu | G06F 30/20 |
| 2018/0012411 A1* | 1/2018 | Richey | G06T 19/006 |
| 2018/0268578 A1* | 9/2018 | Wittkopf | G06T 11/206 |
| 2019/0373186 A1* | 12/2019 | Ortiz Egea | H04N 5/332 |
| 2020/0286251 A1* | 9/2020 | Kaehler | G06F 1/163 |
| 2020/0368616 A1* | 11/2020 | Delamont | A63F 13/213 |

OTHER PUBLICATIONS

Ternovksiy et al., "Data reduction for multispectral and hyperspectral imagery based on application of catastrophe theory", 2000 (Year: 2000).*
Blonda et al., "Multispectral Classification by a Modular Neural Network Architecture", 1994 (Year: 1994).*
Kitazono et al., "t-Distributed Stochastic Neighbor Embedding with Inhomogeneous Degrees of Freedom", 2016 (Year: 2016).*
Wang et al., "Generalized Autoencoder: A Neural Network Framework for Dimensionality Reduction", 2014 (Year: 2014).*
Piumsomboon et al., "User-Defined Gestures for Augmented Reality", 2013 (Year: 2013).*
Buchmann et al., "FingARtips—Gesture Based Direct Manipulation in Augmented Reality ", 2004 (Year: 2004).*
Chen et al., "Design Manifolds Capture the Intrinsic Complexity and Dimension of Design Spaces", 2017 (Year: 2017).*

* cited by examiner

Primary Examiner — Selene A. Haedi
(74) Attorney, Agent, or Firm — Nicholson De Vos Webster & Elliott LLP

(57) ABSTRACT

Techniques for evaluating an output of a machine learning model and using the evaluation to retrain the machine learning model are described. For example, a data set that is output from a layer of the machine learning model is reduced to a 2-D or 3-D representation that is suitable for viewing. A user views the reduced data set in a viewing environment such as virtual reality or augmented reality. The user makes changes using that viewing environment. The changes are then used to retrain the machine learning model.

20 Claims, 13 Drawing Sheets

VIRTUAL/AUGMENTED REALITY DATA EVALUATION

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Traditionally, expertise in statistics and in artificial intelligence has been a prerequisite for developing and using machine learning models. For many business analysts and even for highly qualified subject matter experts, the difficulty of acquiring such expertise is sometimes too high a barrier to be able to take full advantage of the large amounts of data potentially available to make improved business predictions and decisions.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for virtual or augmented reality data evaluation. In particular, embodiments detailed herein are directed to providing a result of a trained machine learning algorithm or model to be used in an interactive multidimensional environment to allow a user to indicate at least quality of the result and then retrain the machine learning algorithm or model using the input from the user. For example, a user is able to indicate that a particular result should be classified in a particular manner using the interactive multidimensional environment.

Machine learning (ML) models, such as classifiers, are machine learning algorithms that have been trained using one or more sets of training data. In most scenarios, the result (output) of such models is evaluated by a person having skill in machine learning techniques. For example, the person that designed the algorithm evaluates the output. Unfortunately, a person having skill in machine learning techniques may not always be the best person to evaluate the output of the ML model. For example, when the ML model is to determine if an object is a "good" or "bad" strawberry, it is unlikely that a person having ML knowledge would perform better than a person that inspects strawberries in a field or at a processing plant. Embodiments detailed herein allow for persons without much ML knowledge (or any at all in some cases) to provide feedback on the output of a ML model using an interactive multidimensional environment.

Figure 1:
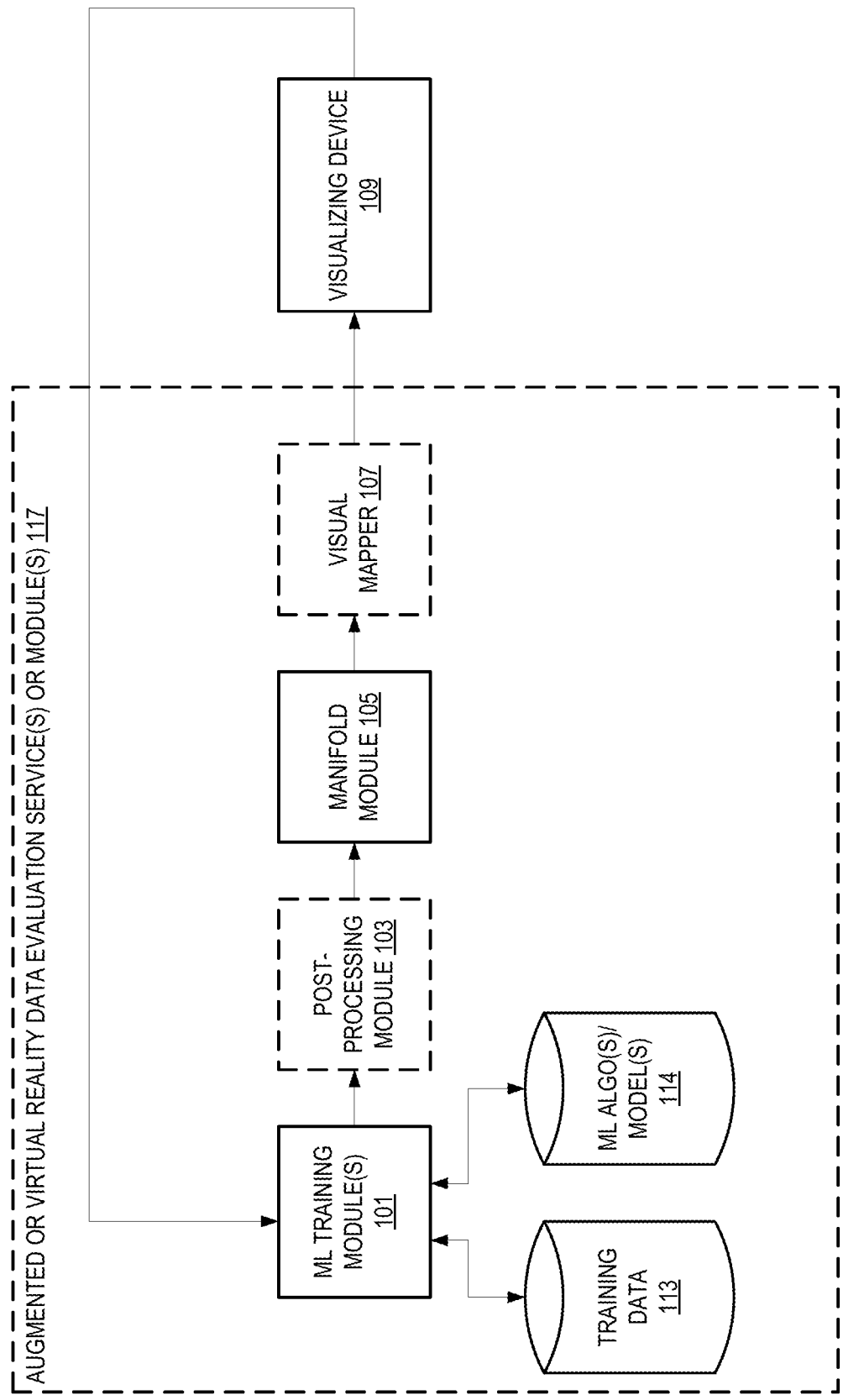
FIG. 1 illustrates embodiments of a system for virtual or augmented reality data evaluation.

FIG. 1 illustrates embodiments of a system for virtual or augmented reality data evaluation. One or more ML training modules 101 are used to train one or more stored ML algorithms or models 114 that are stored in a storage device. These ML one or more ML algorithms or models 114 are trained using stored training data 113. The training data 113 includes a plurality of vectors with each vector having a dimensionality of at least four. In some embodiments, the training data is multispectral (for example, data from a multispectral camera). In some embodiments, the ML model that results from the training by the one or more ML training modules 101 is a neural network such as a convolutional neural network (CNN), recurrent neural network (RNN), etc.

A hidden layer from the trained ML model provides a plurality of high dimensional multidimensional vectors, each of the multidimensional vectors having a plurality of attributes (which are the dimensions). The dimensions specify any point within a space or an object. For example, in some embodiments, a multidimensional vector representing an output of a hidden layer for a ML model analyzing multispectral image data implicitly includes high-level information on color, size, luminosity, etc. These multidimensional vectors describe an object subjected to the ML model and are intermediate representations of the model's output. In some embodiments, a post-processing module 103 is applied to the plurality of multidimensional vectors output from the hidden layer to further refine the output of the hidden layer. Examples of post-processing include, but are not limited to: removal of a proper subset of attributes of the multidimensional vectors, smoothing of one or more attributes of the multidimensional vectors, etc.

High dimensional data can be difficult to interpret. The (post-processed) multidimensional vectors of the ML model or hidden layer are subjected to manifold creation by a manifold module 105 to reduce the dimensionality (for example, down to 2-D or 3-D) for classification. There are many nonlinear dimensionality reduction approaches and the manifold module 105 supports one or more such approaches include, but not limited to, Sammon's mapping, nonlinear principal component analysis (PCA), T-distributed Stochastic Neighbor Embedding (t-SNE), etc. The number of manifolds generated varies, but at least two manifolds will be generated. In some embodiments, the configuration of the approach used by the manifold module 105 is set by a user. For example, for t-SNE, one or more of the perplexity, epsilon, dimensions, scale, and/or points per cluster are set by a user. In other embodiments, these settings are configured based on one or more of the problem to be solved (e.g., image classification), previous usages of similar data sets, etc.

Once the manifolds are created, each of the reduced multidimensional vectors of the at least two manifolds are mapped into a visual space format acceptable to a visualizing device 109, or program, by visual mapper 107.

In some embodiments, the ML training module(s) 101, post-processing module 103, manifold module 105, and visual mapper 107 are implemented as a part of a container. The container may be executed in a local machine, or at a web services provider (or provider network).

In some embodiments, the ML training module(s) 101, post-processing module 103, manifold module 105, and visual mapper 107 are implemented using one or more virtual machines of a web services provider (or provider network).

In some embodiments, the modules, data, algorithms, etc. are components used by an augmented or virtual reality data evaluation service 117 at a provider network (such as a web services provider). In other embodiments, the modules, data, algorithms, etc. are components/modules of an end user device.

The visualizing device 109 is used to show the mapped multidimensional vectors in a visualizable space as mapped objects. For example, as an augmented or virtual reality space. Through this visualizable space, a user may make changes to the data of the mapped multidimensional vectors and/or ignore the data. For example, the user may change a classification from bad-to-good, or good-to-bad, etc. Examples of a visualizing device 109 include, but are not limited to: augmented reality displays such as an augmented reality display provided by augmented reality eyewear or on a screen of an electronic device (such as a tablet, phone, etc.) and virtual reality displays such as virtual reality eyewear.

The visualizing device 109 includes means for interacting with the mapped multidimensional vectors in a visualization environment. Interaction may take many forms, including, but not limited to: virtual interaction (virtual touch, sight commands, etc.) or physical interaction (for example, use of a mouse and/or keyboard, verbal commands, etc.).

Changes made in the visualization environment by a user are provided back to the ML training module(s) 101 such that the ML model/algorithm is retrained using the changes.

Figure 2:
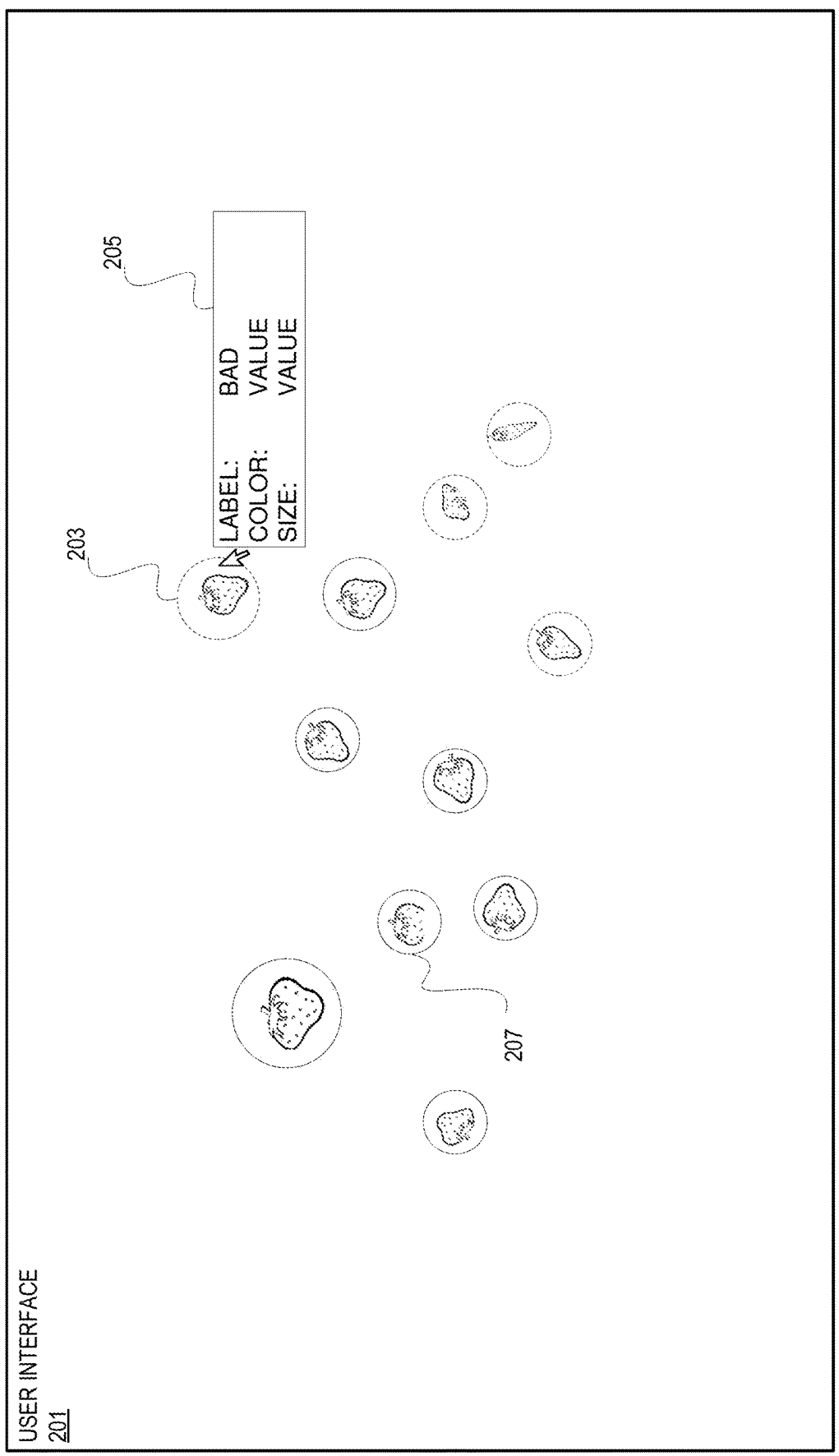
FIG. 2 illustrates embodiments of a graphical user interface for a visualization environment provided by a visualizing device.

FIG. 2 illustrates embodiments of a graphical user interface for a visualization environment provided by a visualizing device. The user interface 201 is generated by one or more of the visualizing device itself, an application calling the visualizing device, a service calling the visualizing device, etc.

As shown, the user interface 201 shows mapped objects (in this example, strawberries). Mapped objects that are in a circle without dashing were considered by the ML model to be "good" and mapped objects that are in a circle with dashing were considered by the ML model to be "bad."

The user interface 201 provides a mechanism for a user to view and/or change information about a particular mapped object as shown in box 205. For example, a user may "hover" or click on object to bring up information about the object including its label (good or bad) and properties about the object itself (here shown as color and size). This mechanism may be utilized to change at least the label.

In this example, strawberry object 207 is marked as good, however, it appears to only be a partial strawberry and should have been marked as bad. Conversely, strawberry object 203 is marked as bad, however, it appears to have at least no physical impairments and possibly should have been marked as good. The user interface 201 allows for a person trained in evaluating the objects to make a better determination based upon the visualization of the mapped object and/or the properties provided by the user interface 201.

Figure 3:
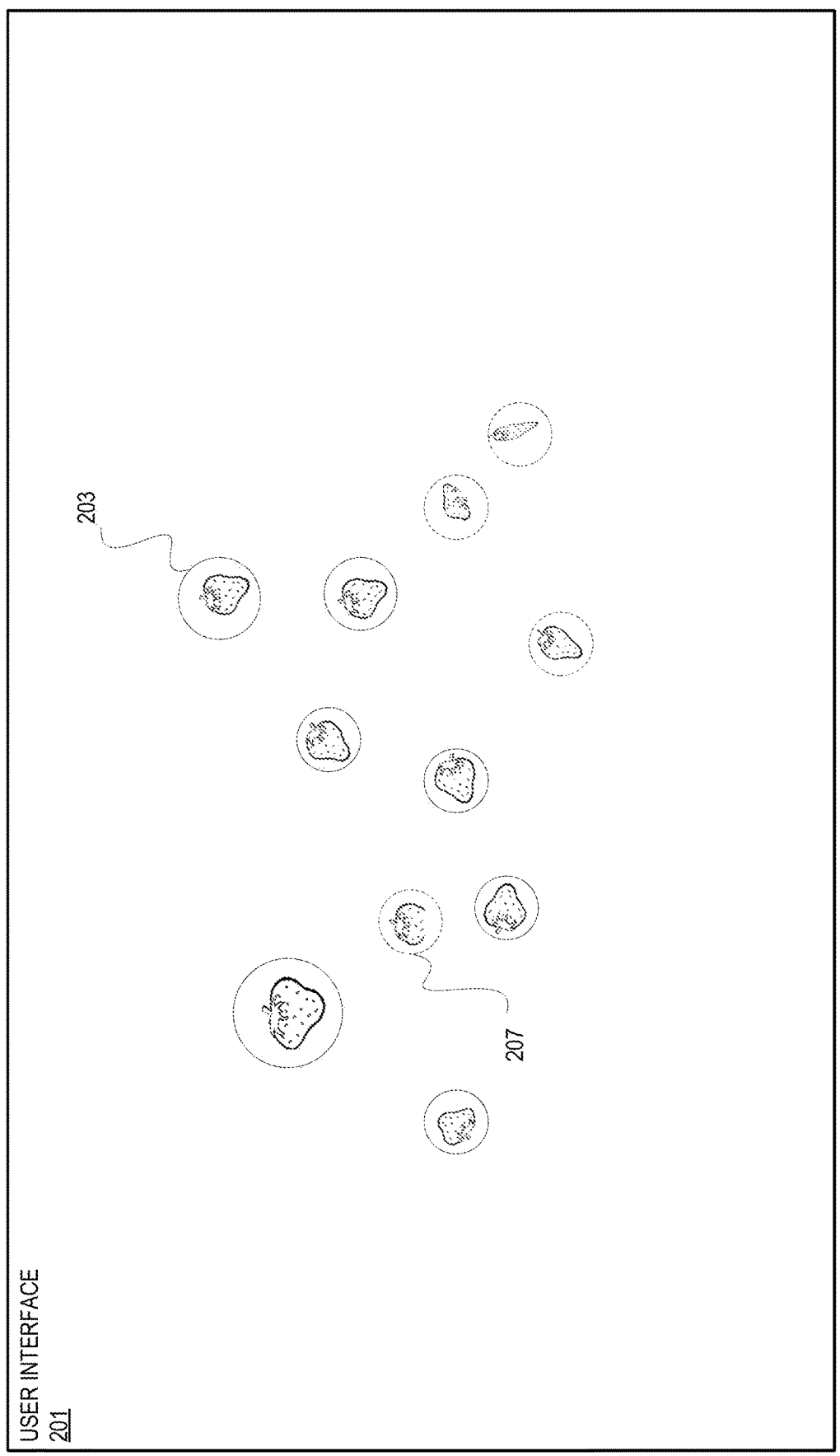
FIG. 3 illustrates embodiments of a graphical user interface for a visualization environment provided by a visualizing device.

FIG. 3 illustrates embodiments of a graphical user interface for a visualization environment provided by a visualizing device. The user interface 201 is generated by one or more of the visualizing device itself, an application calling the visualizing device, a service calling the visualizing device, etc.

In this example, the user of the graphical user interface of FIG. 2 has changed the mappings of objects 207 and 203. In this example, strawberry object 207 is marked as bad and strawberry object 203 is marked as good. These changes are used to retrain the algorithm or model that marked the objects inaccurately. In some embodiments, the algorithm or model is incorrect because of incorrect human supplied labels.

Figure 4:
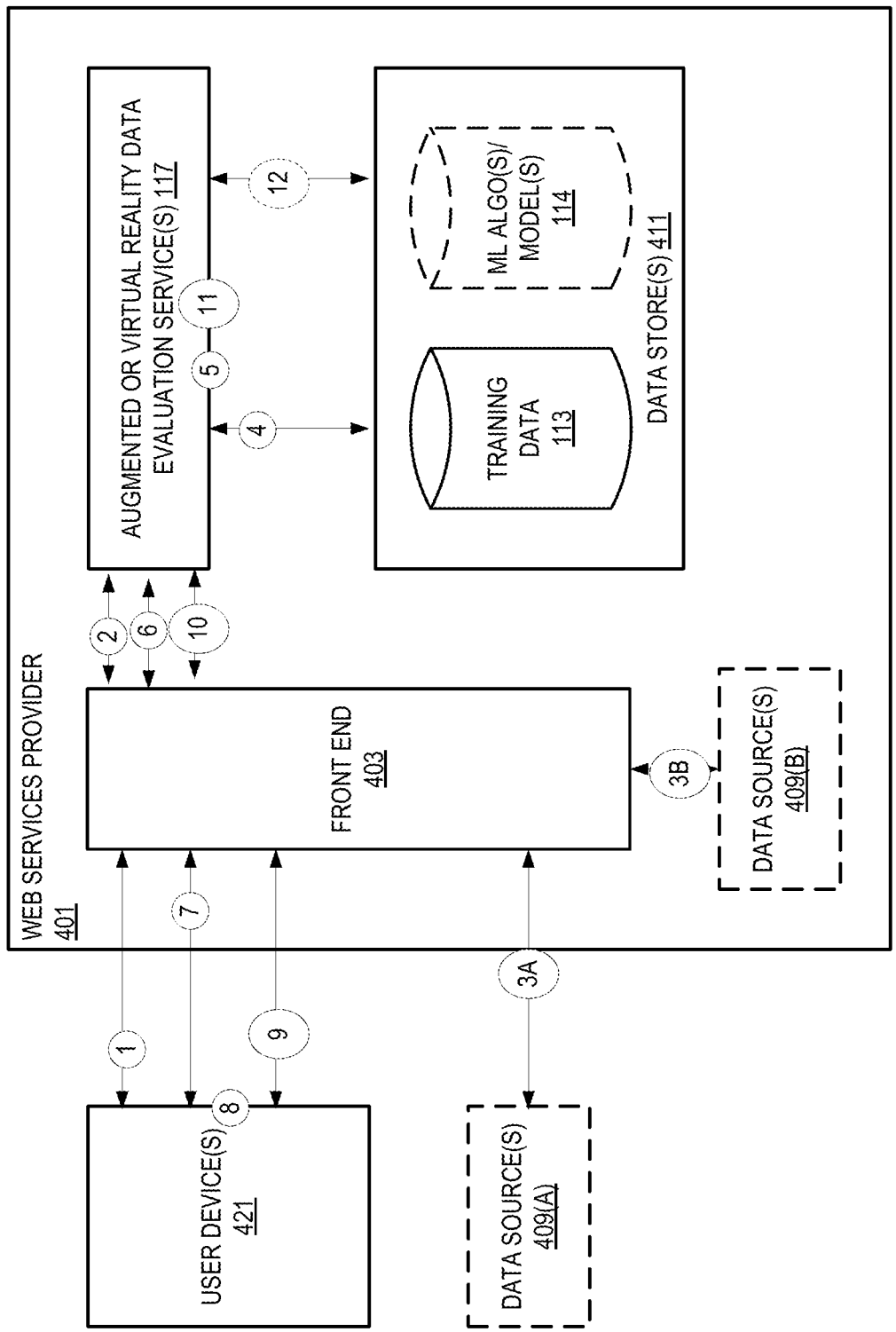
FIG. 4 illustrates embodiments of a system for performing virtual or augmented reality data evaluation in a server context.

FIG. 4 illustrates embodiments of a system for performing virtual or augmented reality data evaluation in a server context. In this illustration, the server is one more servers of a web services provider 401, however, discussions below are applicable to non-web services provider servers (such as a server of an enterprise).

The web services provider 401 receives, via a front end 403, multidimensional data from one or more data sources 409(A), 409(B). Data sources 409(A) and 409(B) may include, but are not limited to, multispectral cameras, sensors (e.g., vehicles, medical devices, audio and/or video based, etc.), other servers (e.g., website servers, commerce servers, supply chain servers, etc.), etc.

The front end 403 forwards, and/or causes to be stored, the received data from the one or more data sources 409(A), 409(B) as training data 113 in one or more training data structures of one more data stores 411. In some embodiments, the front end 403 formats the training data 113 into a proper format for the one or more training data structures. The received data may be "directly" stored in, or passed to, one or more augmented or virtual reality data evaluation services(s) 117 which formats the data (as needed) prior to storage in the structure(s) in some embodiments.

The augmented or virtual reality data evaluation service(s) 117 is engaged by a user of user device(s) 421 to at least map the received multidimensional data into a visualizable space as detailed above. In some embodiments, the augmented or virtual reality data evaluation service(s) 117 perform training on one or more stored ML algorithms or models 114 using the training data 113, or causes such training to be performed. For example, in some embodiments, the augmented or virtual reality data evaluation service(s) 117 executes a container or utilizes a virtual machine to train one more stored ML algorithms or models 114. In some embodiments, the augmented or virtual reality data evaluation service(s) 117 performs one or more of pre-processing and manifold generation as detailed above.

The augmented or virtual reality data evaluation service(s) 117 is configured via the user device(s) 421. For example, settings of a module to map manifold data into a smaller dimensional space are configured via a user device 421 interacting with the front end 403.

User device(s) 421 include a visualizing device in some embodiments.

The circles with numbers in them give an exemplary flow. At circle 1, a user uses the user device(s) 421 to interact with a front end 403 to provide a configuration of the augmented or virtual reality data evaluation service(s) 117 via one or more requests. The configuration may include one or more of: an indication of what algorithm or model to train/re-train, parameters of any pre- or post-processing of the training data and/or output of the trained model to be performed, parameters of manifold generation, and/or parameters of visualization mapping.

At circle 2, the augmented or virtual reality data evaluation service(s) 117 is configured.

At circles 3A or 3B, a data source provides multidimensional data to the front end 403. The front end forwards this data to data store(s) 411 at circle 2. As detailed, this forwarding may include formatting and may go through the augmented or virtual reality data evaluation service(s) 117.

At circle 4, in some embodiments, the augmented or virtual reality data evaluation service(s) 117 retrieves one or more ML algorithms/models 114 to train and associated training data 113.

The augmented or virtual reality data evaluation service(s) 117 interacts with the training data 113 and ML algorithm or model 114 as directed by the request at circle 5.

In some embodiments, the mapped multidimensional vectors produced by the augmented or virtual reality data evaluation service(s) 117 are sent at circle 6 to the front end 403 which then forwards the reduced and mapped multidimensional vectors to the user device(s) 421 at circle 7. In some embodiments, the reduced and mapped multidimensional vectors produced by the augmented or virtual reality data evaluation service(s) 117 are stored (such as in the data store(s) 411) and an indication of their availability is sent to the front end 403 at circle 6 which then forwards the indication to the user device(s) 421 at circle 7.

At circle 8, the user device(s) 421 is used to view the reduced and mapped multidimensional vectors in visualizable space and any corrections to the mapped multidimensional vectors is made. The resulting corrections are sent at circle 9 to the front end 403 which then forwards the corrections to the augmented or virtual reality data evaluation service(s) 117 at circle 10. At circle 11, the algorithm or model 114 is retrained by the augmented or virtual reality data evaluation service(s) 117 taking into account the change(s). In some embodiments, retraining is a batched, offline activity. The resultant model is stored in the data stores 411 at circle 12.

Figure 5:
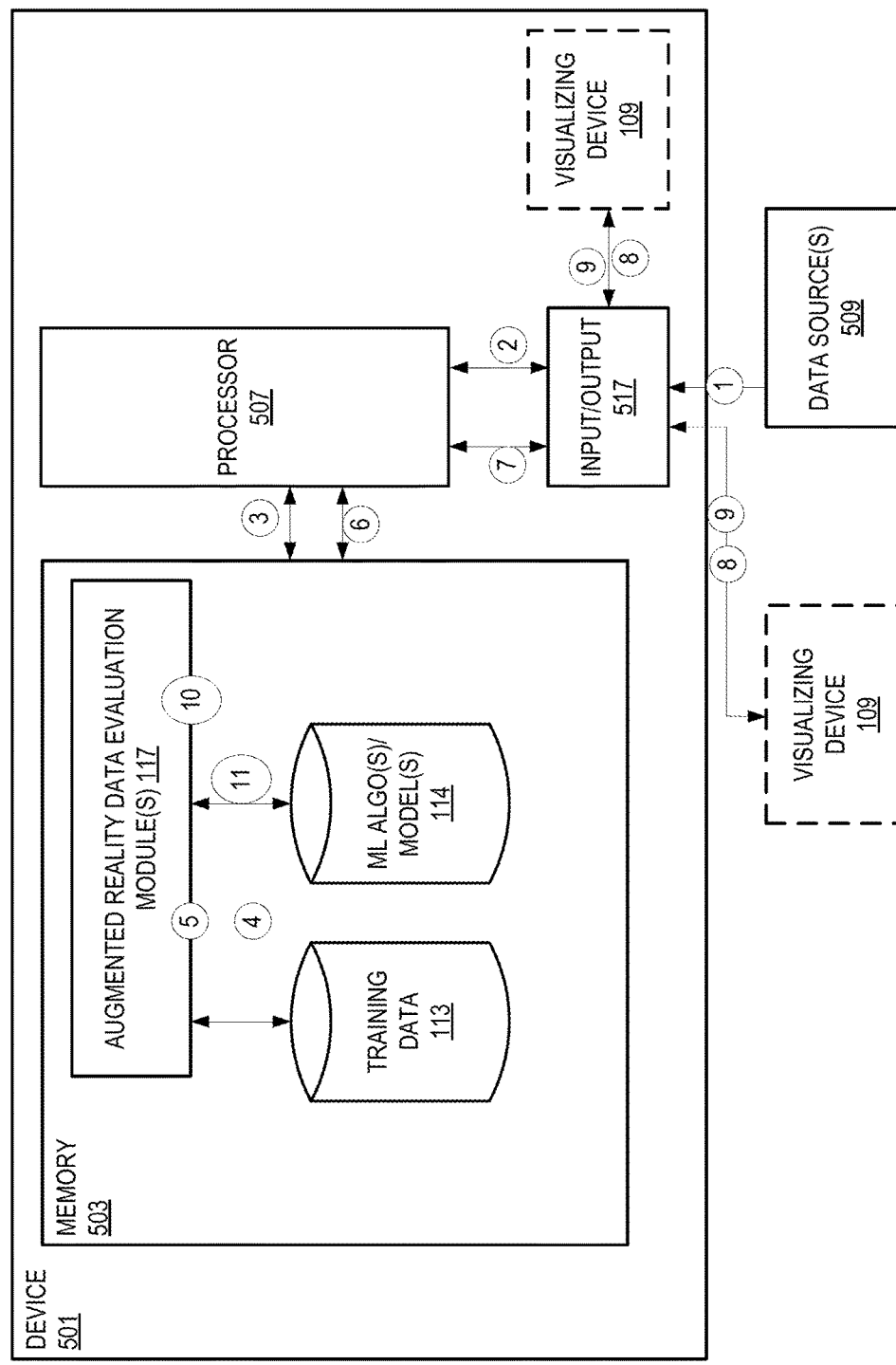
FIG. 5 illustrates embodiments of a system for performing virtual or augmented reality data evaluation.

FIG. 5 illustrates embodiments of a system for performing virtual or augmented reality data evaluation. The device 501 may be a server, desktop computer, mobile device, etc. In some embodiments, a visualizing device 109 is included as a part of the device 501, and in other embodiments it is external to the device 501 as shown. In these embodiments, the augmented or virtual reality data evaluation module(s) 117 include the functionality as shown in FIG. 1.

In this illustration, the device 501 is a standalone device having memory 503 to store the augmented or virtual reality data evaluation module(s) 117, training data 113, and one or more ML algorithms or models 114 to be trained and evaluated. Further, a processor 507 executes the augmented or virtual reality data evaluation module(s) 117.

The device 501 receives training data via input/output mechanism(s) 517 from one or more data sources 509. Data sources 509 may include, but are not limited to, multispectral cameras, sensors (e.g., vehicles, medical devices, audio and/or video based, etc.), other servers (e.g., website servers, commerce servers, supply chain servers, etc.), etc. The input/output mechanism(s) 517 may include a display, keyboard, mouse, interconnect, etc.

The input/output mechanism(s) 517 forwards, and/or causes to be stored, the received data from the one or more data sources 509 into the training data 113. In some embodiments, the augmented or virtual reality data evaluation module(s) 117 formats the received data.

The circles with numbers in them give an exemplary flow. At circle 1, a data source provides training data to the device 501.

The input/output mechanism(s) 517 forwards this data at circle 2. As detailed, this forwarding may include formatting and may go through the augmented or virtual reality data evaluation module(s) 117 via the processor 507 at circle 3.

At circle 4, the augmented or virtual reality data evaluation module(s) 117 calls the training data 113 and the ML algorithm or model 114 to train or evaluate.

The augmented or virtual reality data evaluation modules(s) 117 interacts with the training data 113 and ML algorithm or model 114 as directed by the request to produce reduced and mapped multidimensional vectors at circle 5.

The reduced and mapped multidimensional vectors produced by the augmented or virtual reality data evaluation service(s) 117 are sent at circle 6 through the processor to the input/output 517 at circle 7. The input/output 517 provides the reduced and mapped multidimensional vectors for viewing by the visualizing device 109 at circle 8.

Any changes to the mapped multidimensional vectors are sent back to the input/output 517 at circle 9. The augmented or virtual reality data evaluation modules(s) 117 retrain the algorithm or model at circle 10 and store the retrained model at circle 11.

Figure 6:
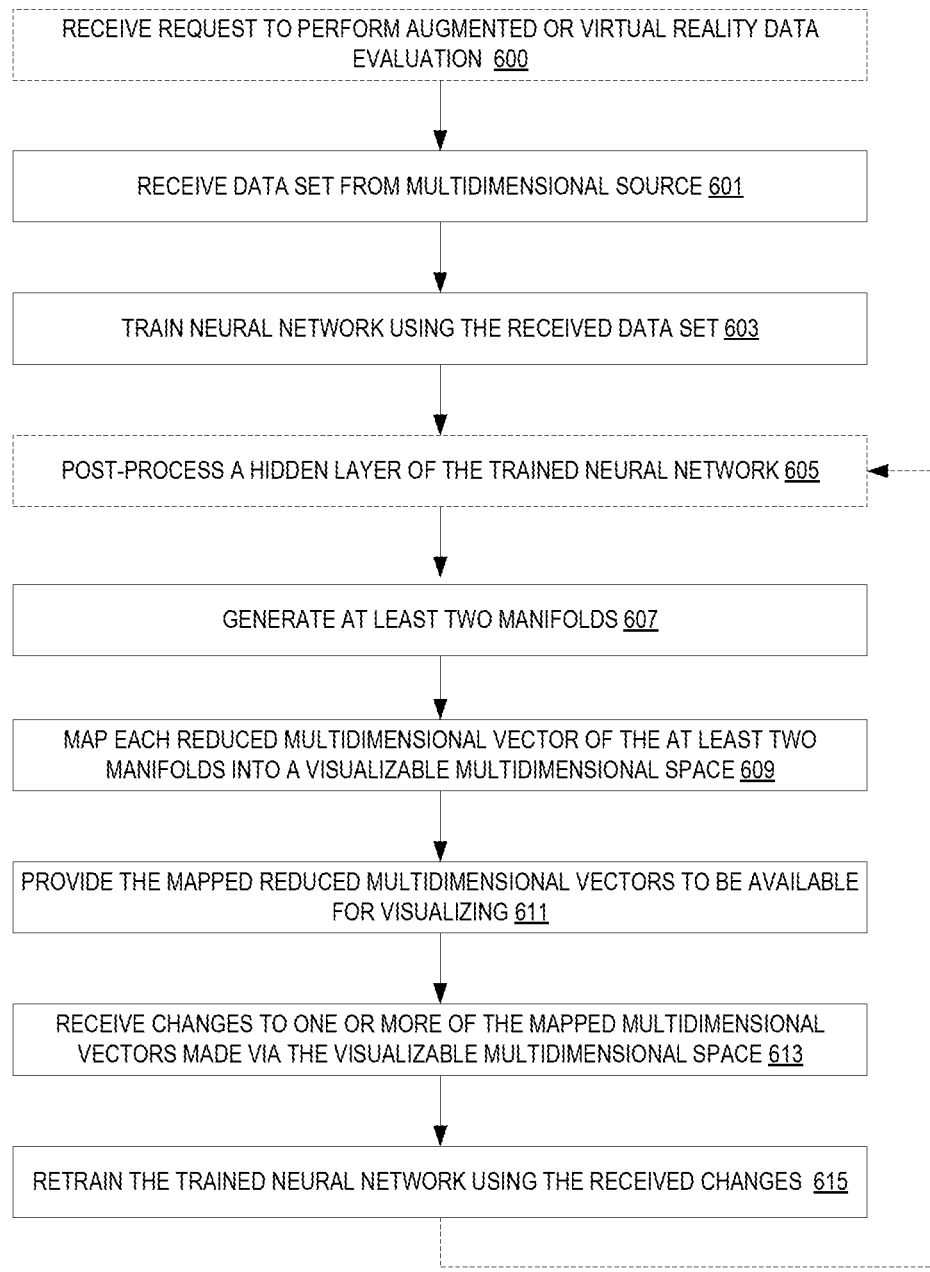
FIG. 6 illustrates embodiments of methods for augmented or virtual reality data evaluation.

FIG. 6 illustrates embodiments of methods for augmented or virtual reality data evaluation. In some embodiments, the method is performed by a service such as augmented or virtual reality data evaluation service(s) 117. In other instances, embodiments of the method are performed by one or more modules of a standalone device.

In some embodiments, such as those using a service, a request to perform augmented or virtual reality data evaluation is received at 600. For example, a request may be in the form of a configuration of the augmented or virtual reality data evaluation service(s) 117 and may include one or more of: an indication of what algorithm or model to train/re-train, parameters of any pre- or post-processing of the training data and/or output of the trained model to be performed, parameters of manifold generation, and/or parameters of visualization mapping. In some embodiments, the request is in the form of a request to start evaluation after the service has been configured.

At 601, a training data set is received from a multidimensional source. Vectors of the training data set have 4 or more dimensions. For example, training data from a multispectral camera is received.

A neural network is trained using the received training data at 603. The neural network being a ML algorithm or model. The training may use a container, virtual machine, or modules as detailed above.

In some embodiments, a hidden layer of the trained neural network is post-processed at 605 as detailed above.

At least two manifolds of reduced multidimension vectors are generated for an output of the (post-processed) trained neural network at 607. In some embodiments, the output is from a hidden layer of the trained neural network. The output of the hidden layer is considered an intermediate representation of the data set output from the trained neural network. Manifold generation has been detailed above.

Each reduced multidimensional vector of the at least two manifolds is mapped into a visualizable multidimensional space at 609.

The mapped reduced multidimensional vectors are made available for visualizing in the visualizable multidimensional space at 611.

At 613, changes to one or more of the mapped reduced multidimensional vectors are received. The changes having been made during visualization in the visualizable multidimensional space.

At 615, the neural network is retrained using the received changes. In some embodiments, the process of manifold generation, etc. is repeated until a satisfactory result is generated.

Figure 7:
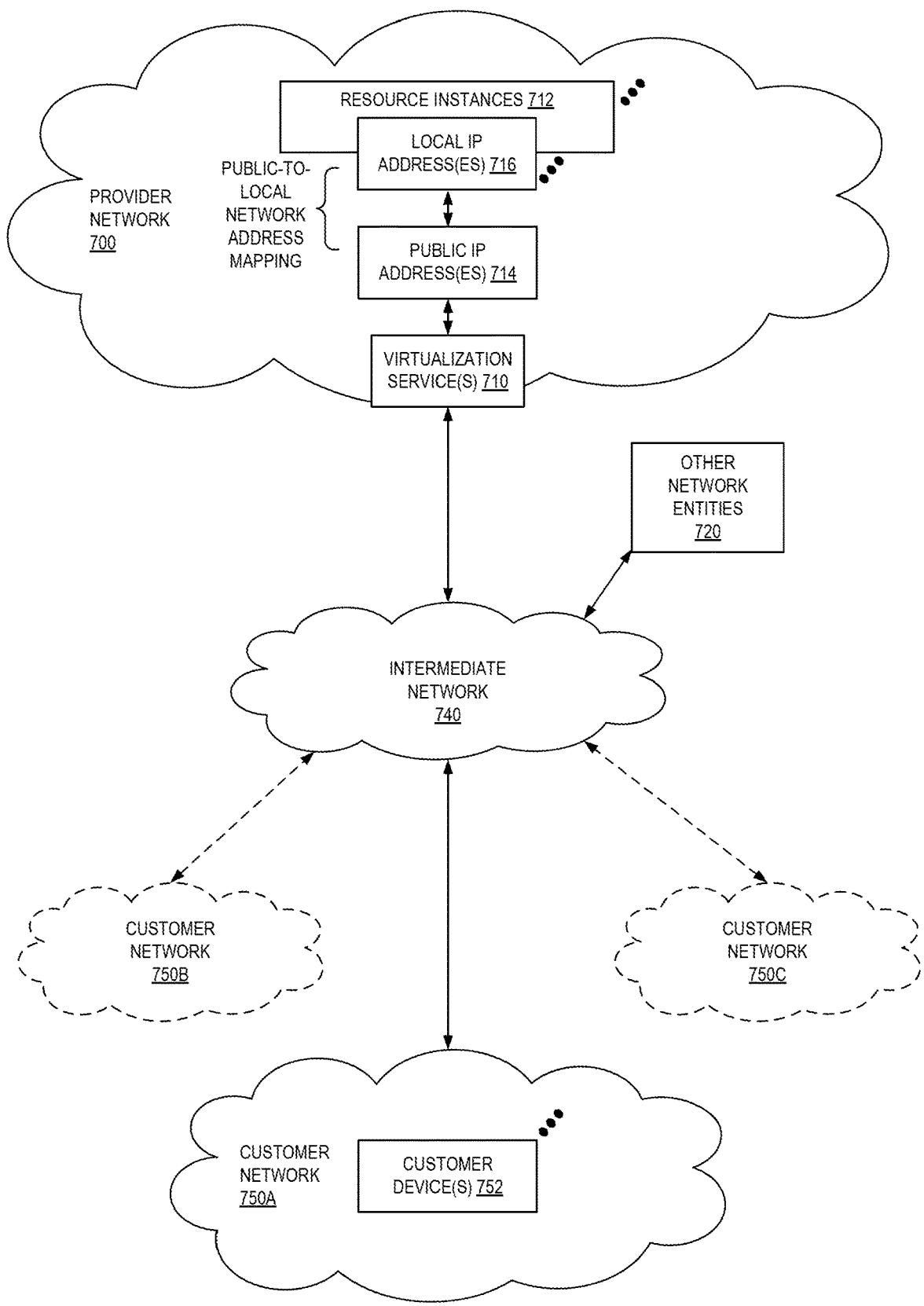
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
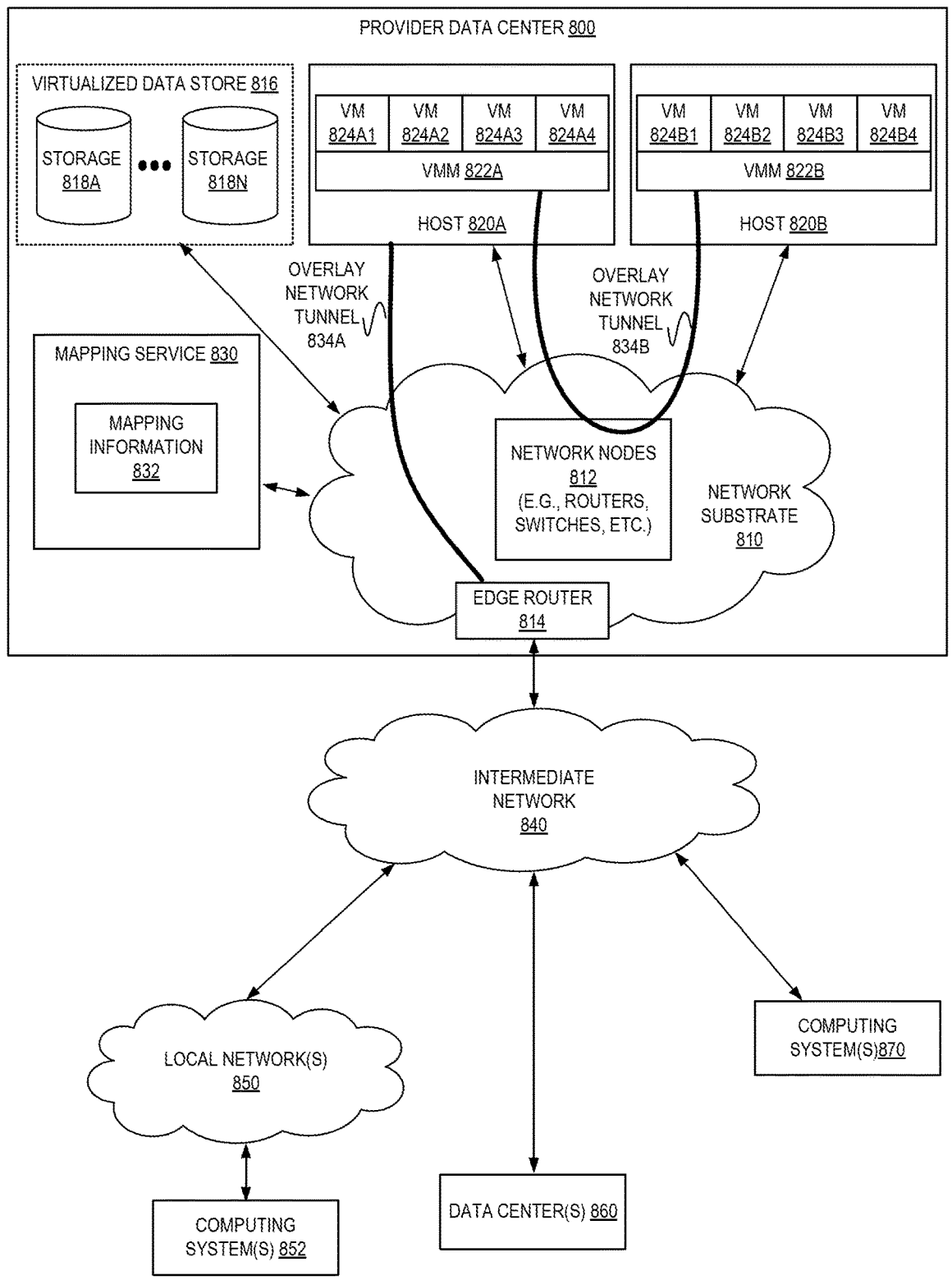
FIG. 8 illustrates an example data center that implements an overlay network on a network substrate using IP tunneling technology according to some embodiments.

FIG. 8 illustrates an example data center that implements an overlay network on a network substrate using IP tunneling technology, according to some embodiments. A provider data center 800 may include a network substrate that includes networking nodes 812 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 810 using tunnels. The IP tunneling technology may provide a mapping and encapsulating system for creating an overlay network on a network (e.g., a local network in data center 800 of FIG. 8) and may provide a separate namespace for the overlay layer (the public IP addresses) and the network substrate 810 layer (the local IP addresses). Packets in the overlay layer may be checked against a mapping directory (e.g., provided by mapping service 830) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 830) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 8, an example overlay network tunnel 834A from a virtual machine (VM) 824A (of VMs 824A1-824A4, via VMM 822A) on host 820A to a device on the intermediate network 850 and an example overlay network tunnel 834B between a VM 824A (of VMs 824A1-824A4, via VMM 822A) on host 820A and a VM 824B (of VMs 824B1-824B4, via VMM 822B) on host 820B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 8, at least some networks in which embodiments may be implemented may include hardware virtualization technology that enables multiple operating systems to run concurrently on a host computer (e.g., hosts 820A and 820B of FIG. 8), i.e. as virtual machines (VMs) 824 on the hosts 820. The VMs 824 may, for example, be executed in slots on the hosts 820 that are rented or leased to customers of a network provider. A hypervisor, or virtual machine monitor (VMM) 822, on a host 820 presents the VMs 824 on the host with a virtual platform and monitors the execution of the VMs 824. Each VM 824 may be provided with one or more local IP addresses; the VMM 822 on a host 820 may be aware of the local IP addresses of the VMs 824 on the host. A mapping service 830 may be aware of (e.g., via stored mapping information 832) network IP prefixes and IP addresses of routers or other devices serving IP addresses on the local network. This includes the IP addresses of the VMMs 822 serving multiple VMs 824. The mapping service 830 may be centralized, for example on a server system, or alternatively may be distributed among two or more server systems or other devices on the network. A network may, for example, use the mapping service technology and IP tunneling technology to, for example, route data packets between VMs 824 on different hosts 820 within the data center 800 network; note that an interior gateway protocol (IGP) may be used to exchange routing information within such a local network.

In addition, a network such as the provider data center 800 network (which is sometimes referred to as an autonomous system (AS)) may use the mapping service technology, IP tunneling technology, and routing service technology to route packets from the VMs 824 to Internet destinations, and from Internet sources to the VMs 824. Note that an external gateway protocol (EGP) or border gateway protocol (BGP) is typically used for Internet routing between sources and destinations on the Internet. FIG. 8 shows an example provider data center 800 implementing a network that provides resource virtualization technology and that provides full Internet access via edge router(s) 814 that connect to Internet transit providers, according to some embodiments. The provider data center 800 may, for example, provide customers the ability to implement virtual computing systems (VMs 824) via a hardware virtualization service and the ability to implement virtualized data stores 816 on storage resources 818A-818N via a storage service.

The data center 800 network may implement IP tunneling technology, mapping service technology, and a routing service technology to route traffic to and from virtualized resources, for example to route packets from the VMs 824 on hosts 820 in data center 800 to Internet destinations, and from Internet sources to the VMs 824. Internet sources and destinations may, for example, include computing systems 870 connected to the intermediate network 840 and computing systems 852 connected to local networks 850 that connect to the intermediate network 840 (e.g., via edge router(s) 814 that connect the network 850 to Internet transit providers). The provider data center 800 network may also route packets between resources in data center 800, for example from a VM 824 on a host 820 in data center 800 to other VMs 824 on the same host or on other hosts 820 in data center 800.

A service provider that provides data center 800 may also provide additional data center(s) 860 that include hardware virtualization technology similar to data center 800 and that may also be connected to intermediate network 840. Packets may be forwarded from data center 800 to other data centers 860, for example from a VM 824 on a host 820 in data center 800 to another VM on another host in another, similar data center 860, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 818A-818N, as virtualized resources to customers of a network provider in a similar manner.

Figure 9:
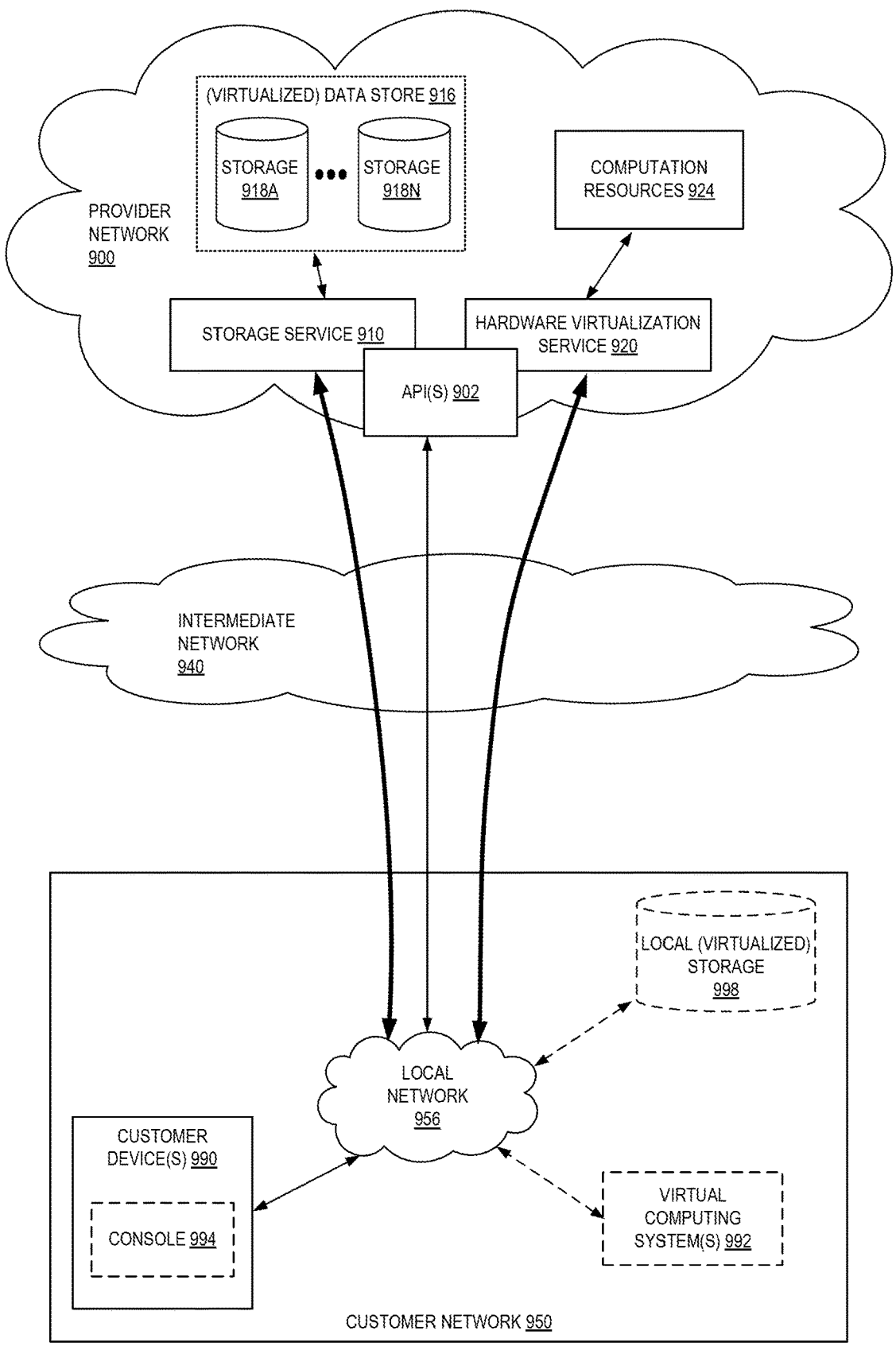
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
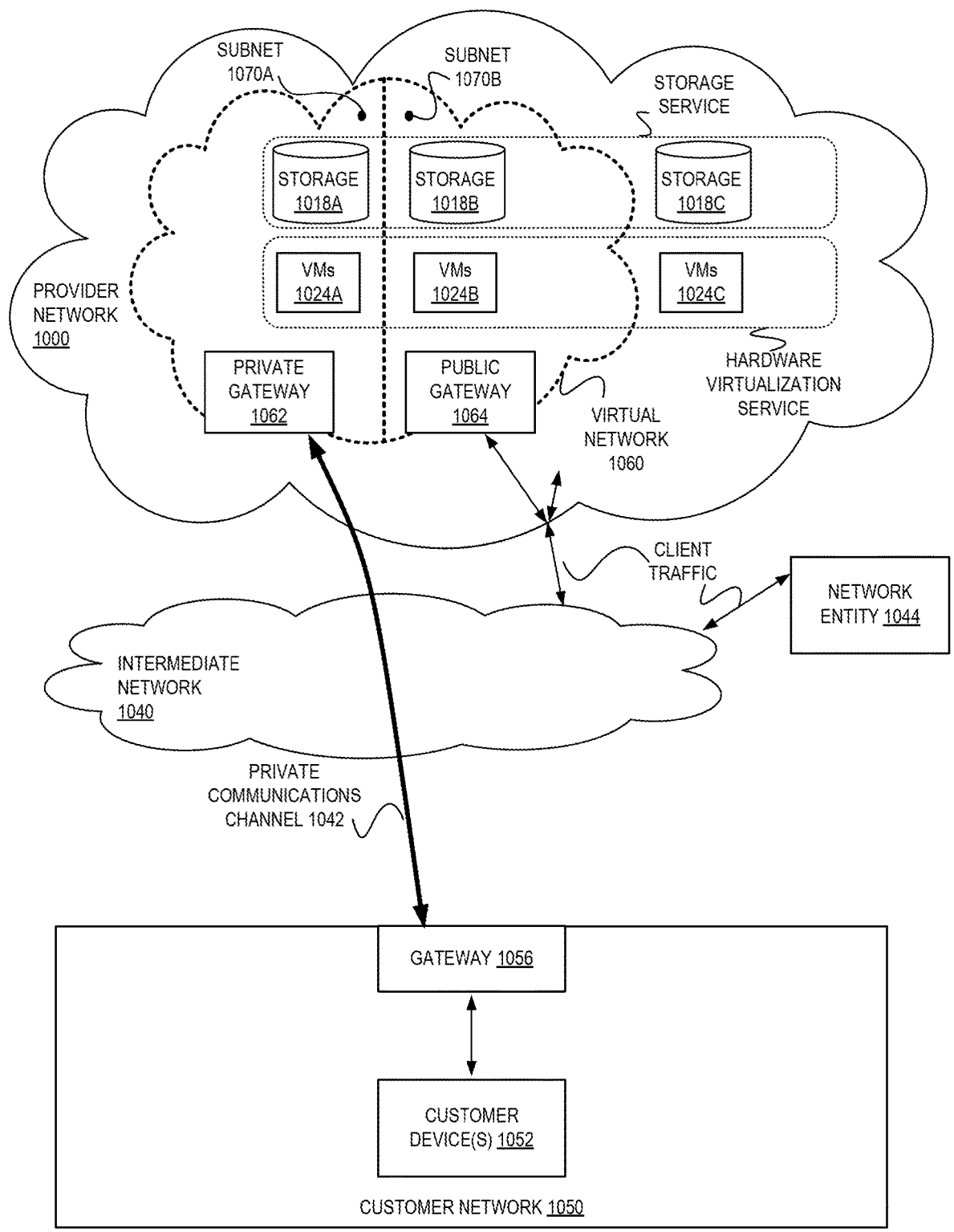
FIG. 10 illustrates an example provider network that provides virtual networks on the provider network to at least some customers according to some embodiments.

FIG. 10 illustrates an example provider network that provides virtual networks on the provider network to at least some customers, according to some embodiments. A customer's virtual network 1060 on a provider network 1000, for example, enables a customer to connect their existing infrastructure (e.g., one or more customer devices 1052) on customer network 1050 to a set of logically isolated resource instances (e.g., VMs 1024A and 1024B and storage 1018A and 1018B), and to extend management capabilities such as security services, firewalls, and intrusion detection systems to include their resource instances.

A customer's virtual network 1060 may be connected to a customer network 1050 via a private communications channel 1042. A private communications channel 1042 may, for example, be a tunnel implemented according to a network tunneling technology or some other technology over an intermediate network 1040. The intermediate network may, for example, be a shared network or a public network such as the Internet. Alternatively, a private communications channel 1042 may be implemented over a direct, dedicated connection between virtual network 1060 and customer network 1050.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1060 for a customer on provider network 1000, one or more resource instances (e.g., VMs 1024A and 1024B and storage 1018A and 1018B) may be allocated to the virtual network 1060. Note that other resource instances (e.g., storage 1018C and VMs 1024C) may remain available on the provider network 1000 for other customer usage. A range of public IP addresses may also be allocated to the virtual network 1060. In addition, one or more networking nodes (e.g., routers, switches, etc.) of the provider network 1000 may be allocated to the virtual network 1060. A private communications channel 1042 may be established between a private gateway 1062 at virtual network 1060 and a gateway 1056 at customer network 1050.

In some embodiments, in addition to, or instead of, a private gateway 1062, virtual network 1060 may include a public gateway 1064 that enables resources within virtual network 1060 to communicate directly with entities (e.g., network entity 1044) via intermediate network 1040, and vice versa, instead of or in addition to via private communications channel 1042.

Virtual network 1060 may be, but is not necessarily, subdivided into two or more subnetworks, or subnets, 1070. For example, in implementations that include both a private gateway 1062 and a public gateway 1064, a virtual network 1060 may be subdivided into a subnet 1070A that includes resources (VMs 1024A and storage 1018A, in this example) reachable through private gateway 1062, and a subnet 1070B that includes resources (VMs 1024B and storage 1018B, in this example) reachable through public gateway 1064.

The customer may assign particular customer public IP addresses to particular resource instances in virtual network 1060. A network entity 1044 on intermediate network 1040 may then send traffic to a public IP address published by the customer; the traffic is routed, by the provider network 1000, to the associated resource instance. Return traffic from the resource instance is routed, by the provider network 1000, back to the network entity 1044 over intermediate network 1040. Note that routing traffic between a resource instance and a network entity 1044 may require network address translation to translate between the public IP address and the local IP address of the resource instance.

Some embodiments may allow a customer to remap public IP addresses in a customer's virtual network 1060 as illustrated in FIG. 10 to devices on the customer's external network 1050. When a packet is received (e.g., from network entity 1044), the network 1000 may determine that the destination IP address indicated by the packet has been remapped to an endpoint on external network 1050 and handle routing of the packet to the respective endpoint, either via private communications channel 1042 or via the intermediate network 1040. Response traffic may be routed from the endpoint to the network entity 1044 through the provider network 1000, or alternatively may be directly routed to the network entity 1044 by the customer network 1050. From the perspective of the network entity 1044, it appears as if the network entity 1044 is communicating with the public IP address of the customer on the provider network 1000. However, the network entity 1044 has actually communicated with the endpoint on customer network 1050.

While FIG. 10 shows network entity 1044 on intermediate network 1040 and external to provider network 1000, a network entity may be an entity on provider network 1000. For example, one of the resource instances provided by provider network 1000 may be a network entity that sends traffic to a public IP address published by the customer.

Figure 11:
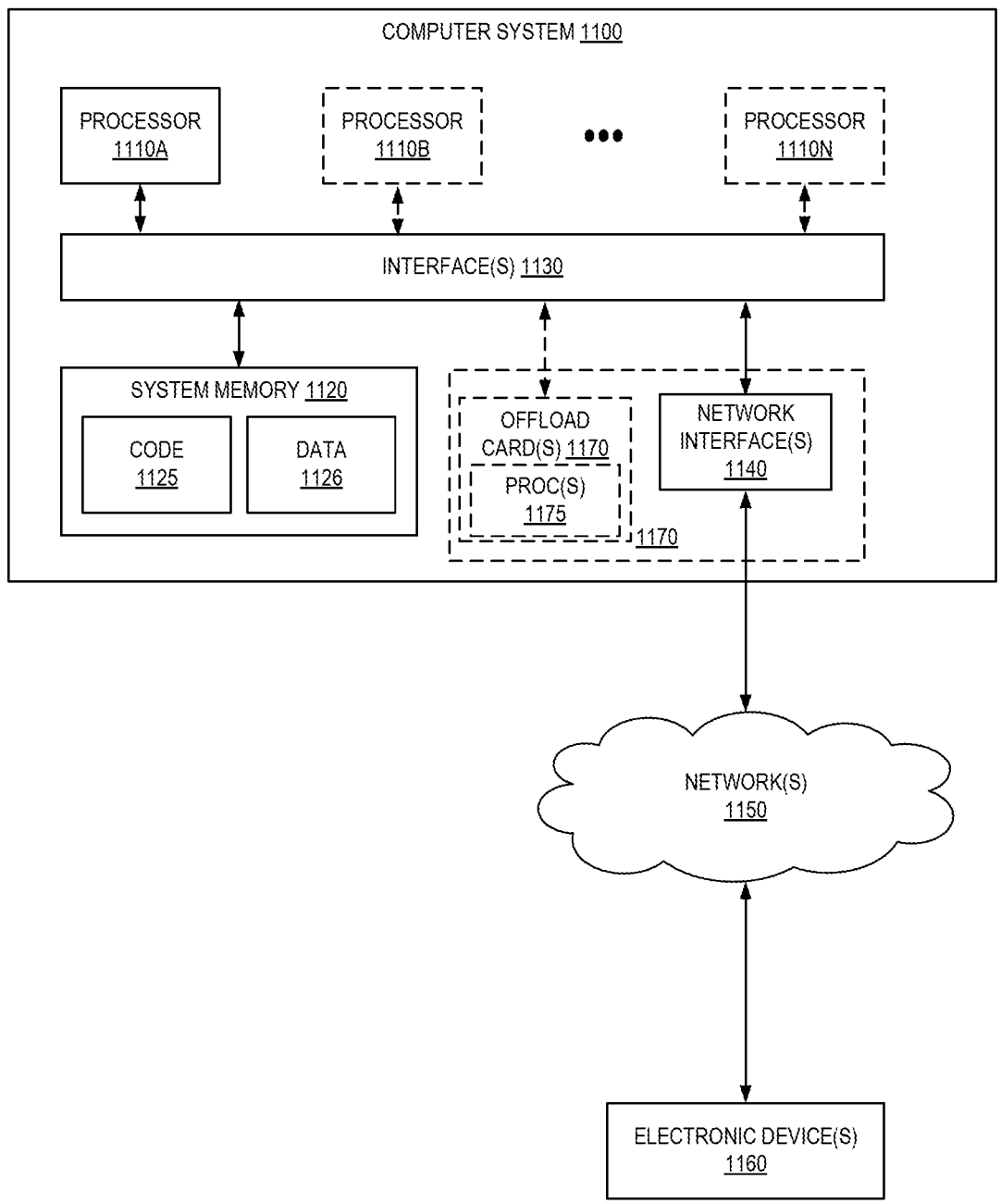
FIG. 11 is a block diagram illustrating an example computer system that may be used in some embodiments.

In some embodiments, a system that implements a portion or all of the techniques for data evaluation as described herein may include a general-purpose computer system that includes or is configured to access one or more computer-accessible media, such as computer system 1100 illustrated in FIG. 11. In the illustrated embodiment, computer system 1100 includes one or more processors 1110A-1110N coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110A-1110N, or a multiprocessor system including several processors 1110A-1110N (e.g., two, four, eight, or another suitable number). Processors 1110A-1110N may be any suitable processors capable of executing instructions. For example, in various embodiments, processors 1110A-1110N may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110A-1110N may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor(s) 1110A-1110N, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor(s) 1110A-1110N). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor(s) 1110A-1110N.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCIe®) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
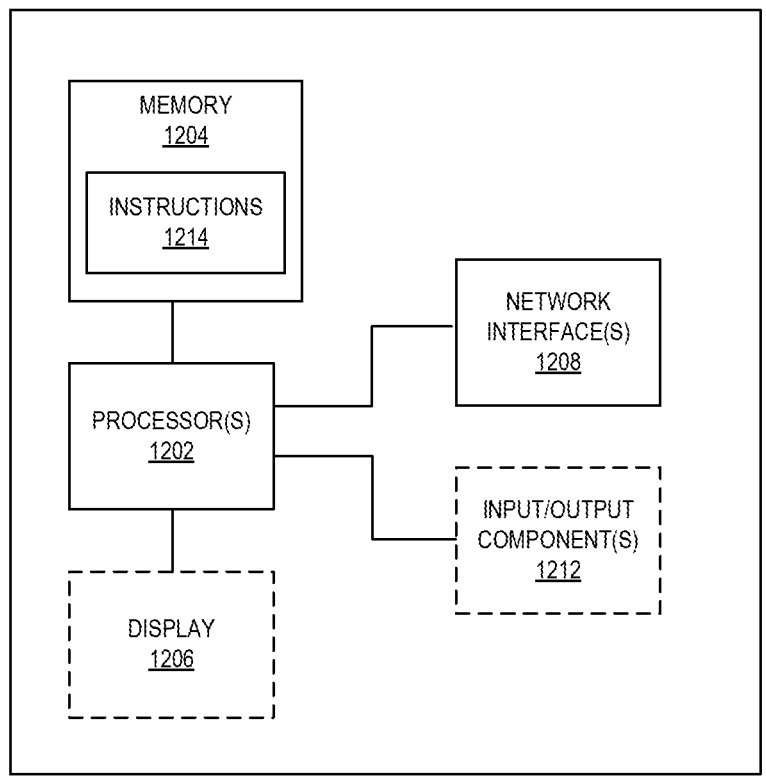
FIG. 12 illustrates a logical arrangement of a set of general components of an exemplary computing device that can be utilized in accordance with various embodiments.

FIG. 12 illustrates a logical arrangement of a set of general components of an example computing device 1200 such as those to provide the engine/service detailed here, etc. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (e.g., instructions 1214) and/or data, and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1214) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
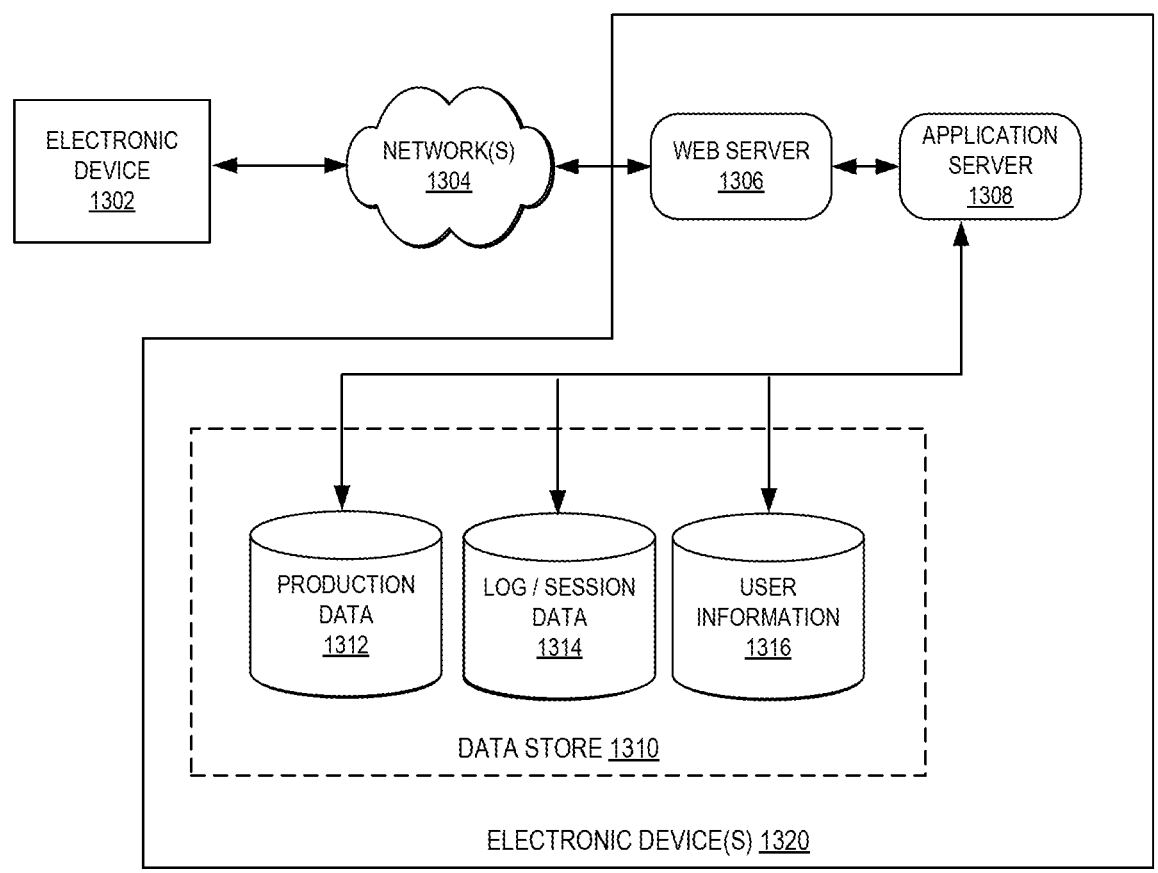
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. For example, in some embodiments requests are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JAVASCRIPT® Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), APPLETALK®, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as PERL®, PYTHON®, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   training a neural network using a multispectral data set of vectors, each vector of the multispectral data set having a plurality of values;
   generating two manifolds of reduced multidimensional vectors for intermediate representations of the multispectral data set, the intermediate representations coming from a hidden layer of the neural network;
   mapping each reduced multidimensional vector of the two manifolds into a visualizable multidimensional space to generate mapped multidimensional vectors;
   providing the mapped multidimensional vectors to be available for visualizing in the visualizable multidimensional space on a virtual or augmented reality device;
   receiving, through a user interface, user changes to one or more of the mapped multidimensional vectors, the user changes corresponding to a changed classification of one or more mapped objects in the visualizable multidimensional space made using the visualizable multidimensional space of the virtual or augmented reality device; and
   retraining the neural network using the user changes.

2. The computer-implemented method of claim 1, wherein the two manifolds are generated using t-distributed stochastic neighbor embedding (t-SNE).

3. The computer-implemented method of claim 1, wherein the plurality of values of the vectors of the multispectral data set is greater than three and the visualizable multidimensional space is a three-dimensional space.

4. A computer-implemented method comprising:
   generating at least two manifolds of reduced multidimensional vectors for intermediate representations of a multidimensional data set output from a neural network, the intermediate representations coming from a hidden layer of the neural network;
   mapping each reduced multidimensional vector of the at least two manifolds into a visualizable multidimensional space to generate mapped multidimensional vectors;
   providing the mapped multidimensional vectors to be available for visualizing in the visualizable multidimensional space;
   receiving, through a user interface, changes to one or more of the mapped multidimensional vectors, the changes corresponding to a changed classification of one or more mapped objects in the visualizable multidimensional space made during visualization of the one or more mapped objects in the visualizable multidimensional space; and
   retraining the neural network using the changes.

5. The computer-implemented method of claim 4, wherein the visualizable multidimensional space is a three-dimensional space.

6. The computer-implemented method of claim 4, wherein the manifolds are generated using t-distributed stochastic neighbor embedding (t-SNE).

7. The computer-implemented method of claim 4, wherein the manifolds are generated using principal component analysis.

8. The computer-implemented method of claim 4, further comprising post-processing the intermediate representations of the multidimensional data set to remove at least one dimension prior to generating the manifolds.

9. The computer-implemented method of claim 4, further comprising post-processing the intermediate representations of the multidimensional data set to normalize at least one dimension prior to generating the manifolds.

10. The computer-implemented method of claim 4, wherein the neural network is a convolutional neural network.

11. The computer-implemented method of claim 4, wherein visualizing in the visualizable multidimensional space is provided using augmented reality.

12. The computer-implemented method of claim 4, wherein visualizing in the visualizable multidimensional space is provided using virtual reality.

13. The computer-implemented method of claim 4, receiving a request to perform virtual or augmented reality data manipulation, the request including a location of the multidimensional data set, a location of a model to train, and a location to store the at least two manifolds.

14. A system comprising:
a visualization device including memory and one or more processors, and configured for viewing a multidimensional space; and
a data evaluation system coupled to the visualization device, the data evaluation system including memory storing instructions that, when executed by one or more processors of the data evaluation system cause the data evaluation system to:
generate at least two manifolds of reduced multidimensional vectors for intermediate representations of a multidimensional data set output from a neural network, the intermediate representations coming from a hidden layer of the neural network;
map each reduced multidimensional vector of the at least two manifolds into a visualizable multidimensional space to generate mapped multidimensional vectors;
provide the mapped multidimensional vectors to be available for visualizing in the visualizable multidimensional space using the visualization device;
receive, via a user interface of the visualization device, changes to one or more of the mapped multidimensional vectors, the changes corresponding to a changed classification of one or more mapped objects in the visualizable multidimensional space made during visualization of the one or more mapped objects in the visualizable multidimensional space by the visualization device; and
retrain the neural network using the changes to one or more of the mapped multidimensional vectors.

15. The system of claim 14, wherein the visualization device is an augmented reality device.

16. The system of claim 14, wherein the visualization device is a virtual reality device.

17. The system of claim 14, wherein the visualizable multidimensional space is a three-dimensional space.

18. The system of claim 14 wherein the manifolds are generated using t-distributed stochastic neighbor embedding (t-SNE).

19. The system of claim 14, wherein the manifolds are generated using principal component analysis.

20. The system of claim 14, wherein the neural network is a convolutional neural network.

* * * * *